(12) United States Patent
Hoblit (10) Patent No.: US 7,467,188 B2
(45) Date of Patent: Dec. 16, 2008

(54) METHOD FOR SCHEDULING AND TRANSMITTING MESSAGES

(75) Inventor: Robert S. Hoblit, Knightdale, NC (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 10/770,310

(22) Filed: Feb. 2, 2004

(65) Prior Publication Data

US 2005/0198207 A1 Sep. 8, 2005

(51) Int. Cl.
G06F 15/16 (2006.01)

(52) U.S. Cl. .................. 709/206; 709/219; 709/223; 379/67.1; 379/88.13; 379/88.25; 725/22; 725/32; 725/42

(58) Field of Classification Search ......... 709/204–207, 709/229, 217, 219, 223; 725/22, 32, 42; 379/67.1, 88.13, 88.25
See application file for complete search history.

(56) References Cited

U.S. PATENT DOCUMENTS

| | | | |
|---|---|---|---|
| 3,889,291 A | 6/1975 | Walker | 360/12 |
| 4,072,986 A | 2/1978 | Heidergren | 360/12 |
| 4,101,742 A | 7/1978 | Craig et al. | 360/12 |
| 4,276,572 A | 6/1981 | Hayashi et al. | 360/12 |
| 4,307,859 A | 12/1981 | Hayashi et al. | 246/124 |
| 4,636,880 A | 1/1987 | Debell | 360/723 |
| 4,741,020 A | 4/1988 | Deal et al. | 379/67 |
| 5,029,014 A * | 7/1991 | Lindstrom | 386/106 |
| 5,541,981 A | 7/1996 | Lynn | 379/88.25 |
| 5,996,006 A * | 11/1999 | Speicher | 709/218 |
| 6,115,365 A | 9/2000 | Newberg et al. | 370/212 |
| 6,175,621 B1 | 1/2001 | Begeja | 379/207 |
| 6,182,120 B1 * | 1/2001 | Beaulieu et al. | 709/207 |
| 6,212,361 B1 | 4/2001 | Lui | 455/512 |
| 6,263,066 B1 | 7/2001 | Shtivelman et al. | 379/266.06 |
| 6,463,462 B1 * | 10/2002 | Smith et al. | 709/206 |
| 7,136,461 B1 * | 11/2006 | Swingle et al. | 379/88.13 |
| 2003/0032409 A1 * | 2/2003 | Hutcheson et al. | 455/414 |

* cited by examiner

Primary Examiner—Nathan Flynn
Assistant Examiner—Mohammad A Siddiqi
(74) Attorney, Agent, or Firm—Sawyer Law Group LLP (57) ABSTRACT

A method for scheduling and transmitting messages is disclosed. The method comprises storing a plurality of audio files in an audio database, generating a schedule of queued messages via the plurality of audio files, transmitting the queued messages based on the schedule, reconfiguring the schedule based on a user interaction delivering the queued messages in accordance with the reconfigured schedule. Through the use of the method in accordance with the present invention, a scheduled plurality of messages can be transmitted in a clear and professional manner. Additionally, "ad hoc" messages can be incorporated into the schedule without significantly disrupting the other messages.

15 Claims, 8 Drawing Sheets

METHOD FOR SCHEDULING AND TRANSMITTING MESSAGES

FIELD OF THE INVENTION

The present invention relates generally to communication systems and particularly to a method and system for scheduling and transmitting messages.

BACKGROUND OF THE INVENTION

In-store public address systems and telephone queuing systems frequently communicate with customers by playing multiple pre-recorded voice messages throughout the day. These systems usually play static (advertising or informational) messages at set intervals which are frequently interrupted by important or ad hoc messages (operational), which override or block the playing of static messages.

In a retail environment, the "static" messages are typically professionally recorded and may be advertisements for products or services. The ad hoc messages are much more mundane, such as paging personnel to answer a phone line, requesting a clean-up of a spilled product, or even advertising of in store specials or events such as announcing to customers that in-store prepared products (fresh baked bread or rotisserie chickens) are freshly available.

Telephone queuing systems also play advertising and informational messages at regular intervals. These messages are periodically interrupted with status information such as expected hold times. In both in store public address systems and telephone queuing systems, instrumental music is frequently used to fill gaps between messages. In both systems however, the interruption of one message to play another results in a choppy presentation of all of the messages. This results in a non-professional presentation, which generally decreases the effectiveness of both messages and can contribute to a consumer's perception that the company is unorganized.

Accordingly, what is needed is an alternative method for queuing messages in the above-described environments. The method should be somewhat simple, cost effective and capable of being easily adapted into existing technology. The present invention addresses such a need.

SUMMARY OF THE INVENTION

A method and system for scheduling and transmitting messages is disclosed. The method and system comprise storing a plurality of audio files in an audio database and generating a schedule of queued messages via the plurality of audio files. The method and system further includes transmitting the queued messages based on the schedule and reconfiguring the schedule based on a user interaction. The method and system finally includes delivering the queued messages in accordance with the reconfigured schedule.

Through the use of the method and system in accordance with the present invention, a scheduled plurality of messages can be transmitted in a clear and professional manner. Additionally, "ad hoc" messages can be incorporated into the schedule without significantly disrupting the other messages.

DETAILED DESCRIPTION

The present invention relates generally to communication systems and particularly to a method and system for scheduling and transmitting messages. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is presented in the context of a preferred embodiment. The preferred embodiment of the present invention is a method and system for scheduling and transmitting messages. Accordingly, the method and system implements a scheme to schedule a queue of messages to be played based on various criteria including, but not limited to the priority of the message, the interruptability of the message, the message length, message repeat parameters, etc. Through the use of the method and system in accordance with the present invention, a scheduled plurality of messages can be transmitted in a clear and professional manner.

A method in accordance with the present invention may be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform a method for scheduling and transmitting messages.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

The plurality of messages upon which the schedule is generated, preferably comprises "static" advertising messages (corporate sponsored messages for various products and/or services) and local advertising messages (in store specials or events such as announcing to customers that in-store prepared products are freshly available). Each of these messages would typically have a relevant set of times that they will be played as well as a target number of repeats.

In addition, actual delivery statistics may be collected. This information might be used to bill vendors for a per-delivery advertising cost which may vary based upon the time of day that the message is played. A rule might also be set which indicates that interrupted messages are not counted as played, and be re-queued for later delivery.

However, when "ad hoc" messages are employed, the schedule must be reconfigured to incorporate the message. Ad hoc messages are messages prompted by a system user and can comprise instructions ("Maintenance, wet spill in aisle 10") and/or announcements ("Freshly baked bread is now available in the bakery"). Accordingly, when ad hoc messages are initiated, the queuing system is responsible for reconfiguring the schedule if the ad hoc message may impact the generated schedule of the queued messages. If messages subsequently become overdue based on conflicts with other messages, the system will reconfigure the queue of messages for a specified time frame (e.g. an hour, a day, etc.) until a time is reached when all scheduling conflicts have been resolved.

Figure 1:
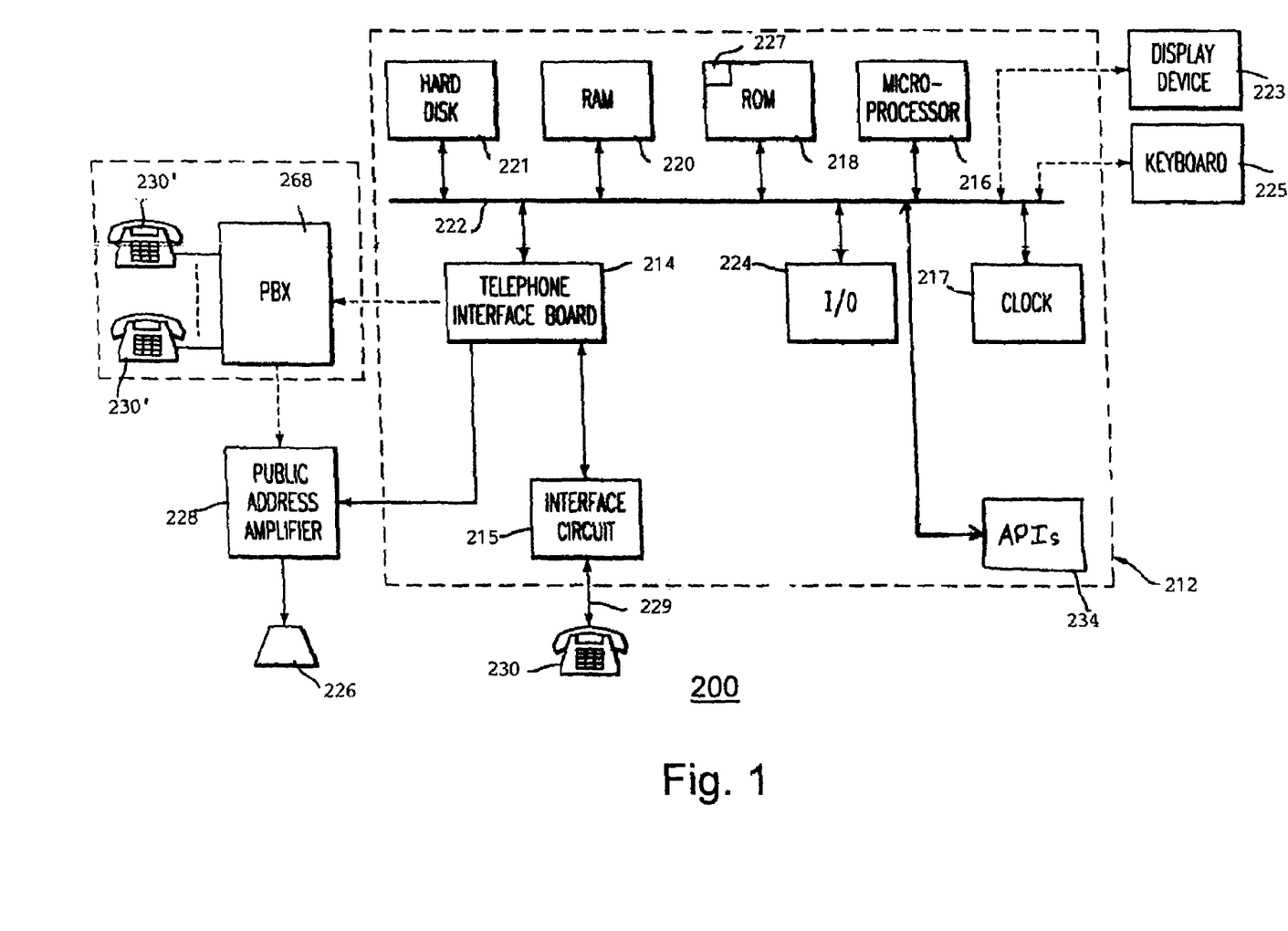
FIG. 1 is a high-level flow chart of a method in accordance with the present invention.

FIG. 1 depicts an example of a system 200 in accordance with the present invention. The system 200 preferably comprises a personal computer 212, which is provided with a telephone interface card 214 in one of its expansion slots (not shown) or a LAN connection which provides an interface into an in-store announcement system. The PC 212 comprises a microprocessor 216, a read-only memory (ROM) 218, a random access memory (RAM) 220, and a magnetic hard disk drive 221, all of which operate in conjunction with the telephone interface board 214 using a standard bus 222. The PC also includes a clock 217 and conventional input/output interface components 224 such as serial communication ports. The microprocessor 216 is programmed to selectively and automatically play recorded audio messages, which have been previously stored on preferably a hard disk 221, over a public address loudspeaker 226 that is driven by a public address amplifier 228. The amplifier 228 can be connected to the PC 212 by a conventional telephone line 229 using the telephone interface board 214. The telephone line 229 is preferably coupled to the telephone interface board 214 via an interface ciruit 215. One or more conventional telephones or other devices (cash registers, other computer systems, etc.) can be connected to the PC through a private branch exchange (PBX). Current technology may enable the connection via LAN attachments.

The system 200 is also provided with a display device 223 (e.g., a video monitor or LED display screen) and a keyboard 225 connected to the bus 222. The keyboard can be used to enter graphic or alphanumeric messages to be stored and displayed on the display device 223, as well as to perform system functions such as reviewing, modifying or deleting graphic messages or entering data for scheduling message play times. Alternatively, another type of input device can be employed, for example, to store video signals for generation on the display device 223 in accordance with the present invention.

The system may also include a plurality of Application Programming Interfaces 234 (APIs) that can interact with the system. These interfaces can also interact with other systems that are coupled to the system 200. For example, DLLs or remote procedure calls may be provided which may be used to create a new user interface into the system, or may allow batch processing of input to queue new messages, or report on entries within the system.

Figure 2:
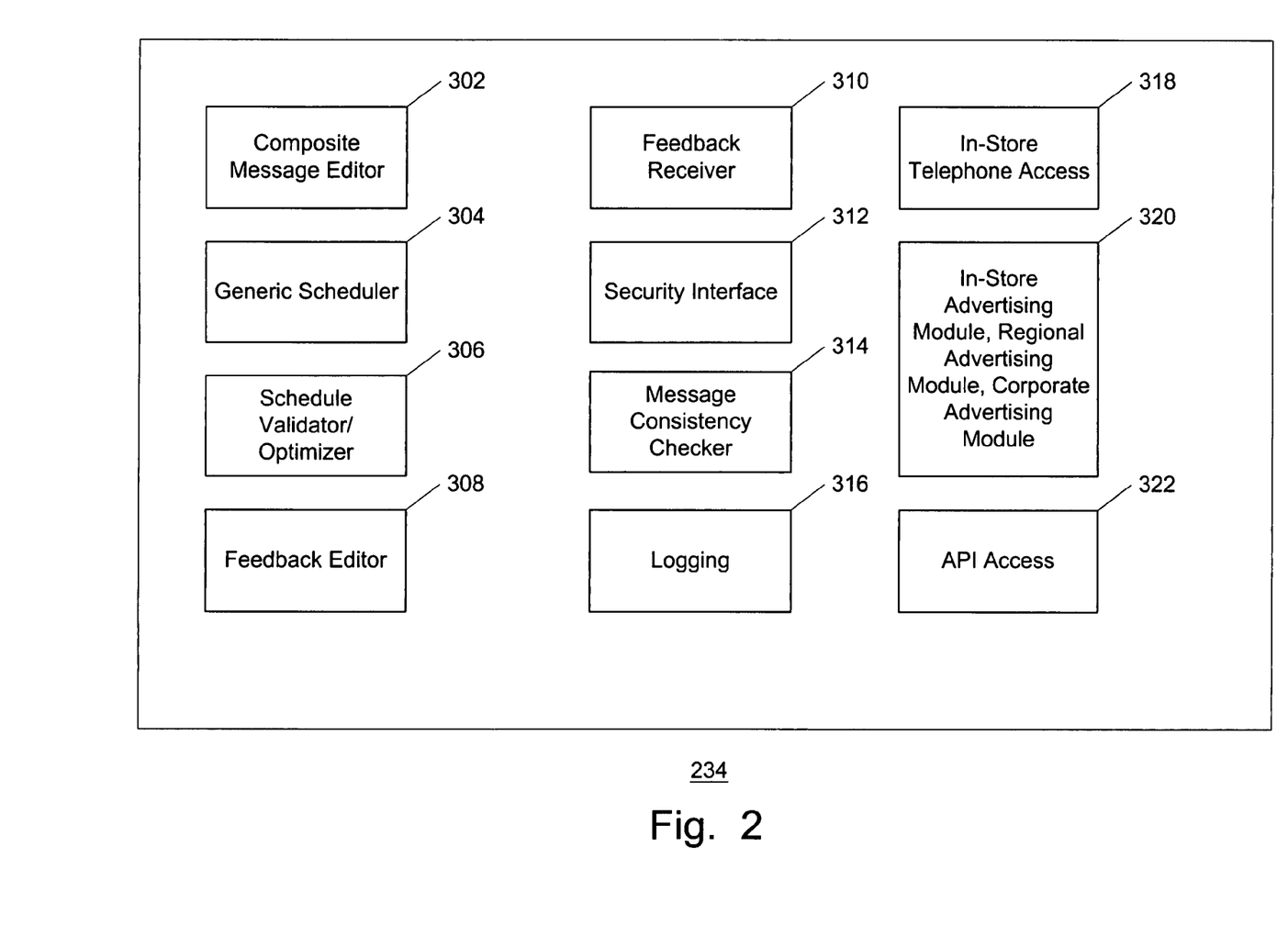
FIG. 2 depicts an example of a system in accordance with the present invention.

FIG. 2 is a block diagram illustrating a plurality of logical components 234 that interact with the system 200. An implementation of these components would likely use the API to update the system. These interfaces include, but are not limited to, a composite message editor 302, a generic scheduler 304, a schedule validator/optimizer 306, a feedback editor 308, a feedback receiver 310, a security interface 312 and a message consistency checker 314. These interfaces will be described in detail hereinbelow.

Composite Message Editor 302

The composite message editor is an interface which allows the user to define the message segments and rules associated with creating a complete message. The composite message editor applies these rules to ensure that the message can be properly constructed based upon the rules defined for a message to ensure that the composite message component parts are available. The composite message editor minimally includes the ability to save/edit/delete messages. These actions may further be exported to another system.

Generic Scheduler 304

The generic scheduler is a module which allows a user to define schedule times including repeats. The user is provided the ability to save the schedule for later use when queuing in messages. This enables the user to associate an audio message with the schedule rather than maintaining unique schedule data for each message.

Schedule Validator/Optimizer 306

The schedule validator/optimizer validates and optimizes the schedule of the various messages. This interface allows the user to "check" the schedule of queued messages to inspect the level of calculated overlap or collision between messages. The optimizer could recommend changes to the schedule in order to reduce the number of collisions. The queuing system itself handles collisions by sorting the colliding messages by priority and playing them serially. However this interface allows the user to review the set of scheduled messages in order to determine if there are too many periods of high collisions, or if the scheduling is such that ad-hoc messages would create significant disturbances in the schedule.

Feedback Editor 308

The feedback editor is a component which leads a user through the process of defining the various specifics related to obtaining feedback. (Feedback is discussed further herein below.)

Feedback Receiver 310

The feedback receiver receives the feedback results from the system. In a simple case the data is simply stored in a database for later use or may be dumped into a file.

Security Interface 312

The security interface comprises security methods or processes in order to assign accountability of actions to the logged in user, and therefore protect the business image. Due to the nature of this system, there should be varying levels of security for each of the various methods of inputting data into this system. The specific security measures employed will vary from implementation to implementation.

Message Consistency Checker 314

A message consistency checker can be provided to ensure that all of the various message components are available within the system. Basically, this function performs a consistency check on the various tables of the database to determine what tables refer to entries in other tables that do not exist. These results are reportable both locally and remotely.

Logging 316

All significant actions within the system should be logged to an audit log to provide for an audit of the system as well as to assist support of the system. This is a basic requirement of any computer based system. The details of the amount of data logged and the format of the data logged may be dependent on several factors, but such detail is not material to this disclosure.

In-Store Telephone Access 318

The In-Store telephone access will allow a user to queue a message via selecting the initial category of the message, then, the individual variable components of the message. Note that in order to support this sort of function, the user could be required to key enter different codes in the system to select the various message components. In the best implementation, the access system will contain an audio recording which describes the category and selection options for the various variable portions of the audio message. In an ideal implementation, in order to facilitate ease of use and reduce the effort required to complete the component parts of the message, different component parts might be maintained.

For instance, the "maintenance cleanup" message above might be maintained in the system, but there might also be a table in the database which allows a composite message to define another composite message while specifying some of the variable parts, for instance, creating a "dry spill" message, and a "wet spill" message by utilizing the main components of the "maintenance cleanup" message.

Telephone based access is an important component of the system as it provides an inexpensive interface into the system at various locations throughout the store, without requiring hardware installations at those locations where a telephone is already installed.

In-Store Advertising Module, Regional Advertising Module, Corporate Advertising Module 320

The advertising modules are distinct modules within the system, each with different rules applied to determining how to queue messages. In the most basic implementation, the In-Store module allows queuing of a subset of messages, and allows adding trivia messages to the system. The regional and corporate modules include more advanced function, such as setting up to obtain feedback from the shoppers in the store, and may include more advanced tie-ins to other systems with this feedback.

The feedback obtained may be used in several ways. The retailer already knows how many customers and dollars worth of sales volume occur at each store by reviewing sales data information, but may be interested in determining other information related to the advertising.

Using such a system, the retailer might be able to determine the reach of advertising to mobile device users simply by requesting identification by the device as feedback to all mobile devices in the store at the time that the advertisement is played. The advertisement may then be evaluated by tracking the sales of the customers present to determine if the advertisement produced results. In this case, the feedback did not include a prompt for information from the user; the mobile device could service the request without user interaction.

In a preferred embodiment, the Corporate and Regional advertising modules should support an easy export of data to facilitate transmission of the scheduled messages to remote locations.

API Access 322

APIs written for this system should be written with the intent of creating an application developer's interface into the system to allow for quick application development and ease of use.

The APIs are intended to be the basis of all development work related to the system. In an actual implementation, it is expected that there may be several special purpose programs at a single retailer's location, which are designed to queue only a subset of messages and may be tailored to the retailer's specific environment. The need for this is driven by the usually unique needs of different retailers based upon operational differences. Further, the responsibilities of those persons performing different jobs within the store will have different uses of the system.

In general, the API access should, but does not need to allow full administration of the system.

A sensible system design would include use of the APIs by each of the above modules which are expected to be a part of the system.

The underlying architecture of the API is not material to this disclosure. A preferred embodiment of the architecture will take advantage of the use of a routable protocol to allow use of the same API set for local access as for remote access.

In a preferred embodiment, emerging technologies such as XML and Simple Object Access Protocol (SOAP) with attachment could be used to support all messaging within the system. Audio files may be transmitted in a SOAP message as an attachment.

Since the APIs are intended to provide the application developer with most if not all of the functions required to maintain the system, the following are examples of the types of functions which most likely should be included in the API:

Add/Erase/Update each of the database tables (Note that some of these functions may be provided via interfaces into the database directly, but since not all users should have direct access into the database, it is expected that the API will provide the access into the database to ensure that the system rules are enforced.)

Add/Erase/Update of feedback instructions

Add/Erase/Update of queued messages

Even though this function will most likely result in a table update for the database, this function is listed separately since the function is more specific than simply updating an audio clip in the database.

Validation functions

Referring back to FIG. 1, preferably, the system 200 further includes an audio database 320 for storing an archive of audio files. The audio database 227 could be located in the hard disk 221, the ROM 218 or another suitable location in the computer 212. In this embodiment, the audio database 227 is located in the ROM 218. The audio database 227 maintains a table of the audio files wherein the table includes information related to the audio file, e.g. the category of the file, the length of the file, a short description of the file, an index number of the file, etc.

Figure 3:
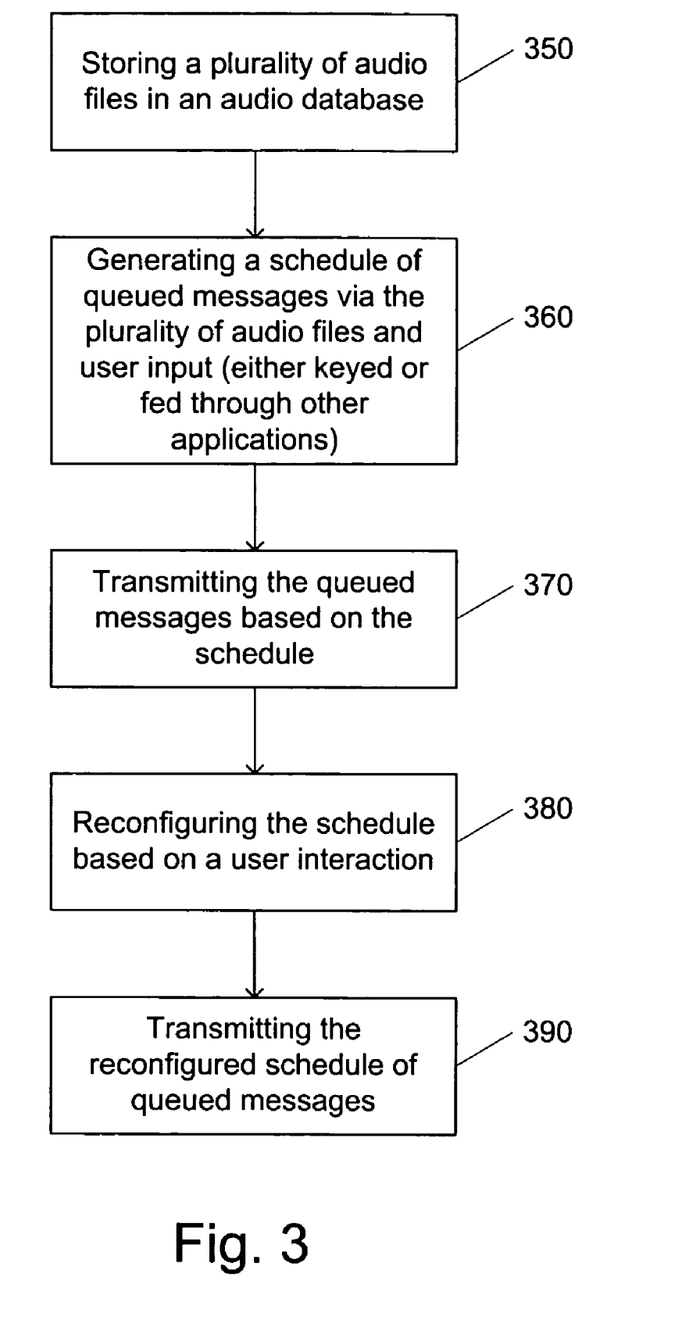
FIG. 3 is an illustration of an alternate embodiment of the present invention.

FIG. 3 is a high level flowchart of the method in accordance with the present invention. First, a plurality of audio files is stored in an audio database, via step 350. A schedule of messages is then generated via the plurality of audio files, via step 360. Generating the schedule of messages must be accomplished by building the messages in accordance with a schedule profile.

Figure 3A:
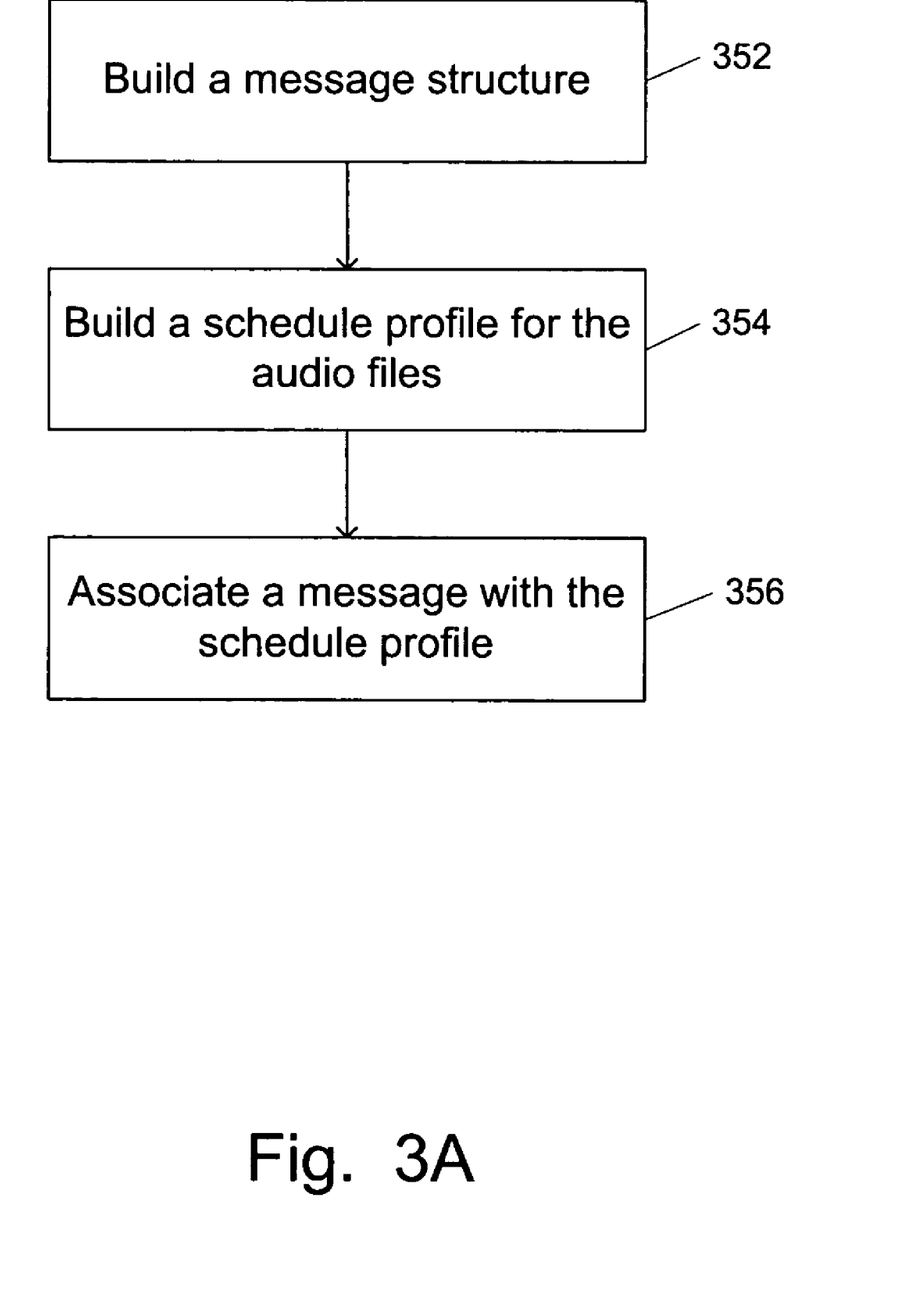
FIG. 3A is a flow chart for generating a schedule of messages in accordance with the present invention.

FIG. 3A is a flow chart for generating a schedule of messages in accordance with the present invention. Referring to the Figure, first a message structure is built, via step 352. Next, a schedule profile for the audio files is built, via step 354. Thereafter, a message is associated with the schedule profile, via step 356. Accordingly, the schedule of messages is generated.

Referring back to FIG. 3, the queued messages are then transmitted based on the schedule, via step 370. Next, the schedule is reconfigured based on a user interaction, via step 380. Finally, the queued messages are delivered in accordance with the reconfigured schedule.

By way of example, an audio file requesting a manager to come to the customer service counter might be a professionally recorded "wav" file featuring a pleasant sounding woman's voice saying the words "store manager needed at customer service for customer assistance". The category might be "Store Operations Announcement"; the description might be "Manager report to customer service".

Additionally, the audio file could be a composite message. A composite audio message is an audio message which is made up of various components. A composite audio message might be a single audio clip from the audio database, but could in fact be a combination of message components that are selected based on a user interaction. The composite message could be expressed in the database as a set of static and variable components. For example, the message "Maintenance, please report to aisle 3 for a dry spill clean-up." can be broken down into the following components:

| | |
|---|---|
| "Maintenance, please report to" | Static |
| "aisle" | Variable |
| "3" | Variable |
| "for a" | Static |
| "dry spill" | Variable |
| "cleanup" | Static |

The static audio clips are selections from the audio database, but to construct a "store cleanup" message, these components are always fixed. The three selectable components are selected by a user preferably via a telephone/keypad type device. The resulting composite message accordingly comprises the specific static message components as well as the selected variable components. It should be appreciated by one of ordinary skill in the art that the selection of the variable components of the message could be designed to conform to a set of predetermined rules that govern their selection.

Composite messages are preferably utilized to allow a user to queue the "ad hoc" messages. This is preferably accomplished via a telephone/keypad-type device whereby an initial category of the message is selected and then the individual variable components of the message are selected. Note that in order to support this sort of function, the user could be required to key enter different codes in the system to select the various message components. For example, an access system utilized by the keypad-type device to access the audio database could contain an audio clip which describes the category and selection options for the various variable portions of an audio message.

All queued messages include a complete audio message, all necessary scheduling attributes, and feedback instructions. A message cannot be queued without all of the data required by the queuing system. Furthermore, all of the message components should be available prior to queuing. It is possible to queue messages which are comprised of separate components (such as queuing a static message with no feedback). In these cases the attributes are defined but have no actions associated with them.

If the system attempts to queue a message for which all of the components are not available, the message is not queued and error information is returned to the user. In order to avoid this situation, the system also includes functions to assist in validating that all of the components for a given message are available and should be able to provide a sufficient amount of information to identify the problem and perform an appropriate corrective action. End user application programs designed to interface with this system should appropriately prompt the user for the required information in order to minimize the chance of error and optimize the usability of the queued message.

Another feature of the present invention involves the added functionality of generating feedback from the scheduled transmission of messages. Feedback is any data collected as a result of prompting for information related to an audio message. The information could be related to advertised products, including special offers for store products or the information could be related to ad hoc messages, e.g. whether a store manager has responded to earlier page. In order to include this functionality, the above-described system must include feedback device(s) coupled thereto.

Figure 4:
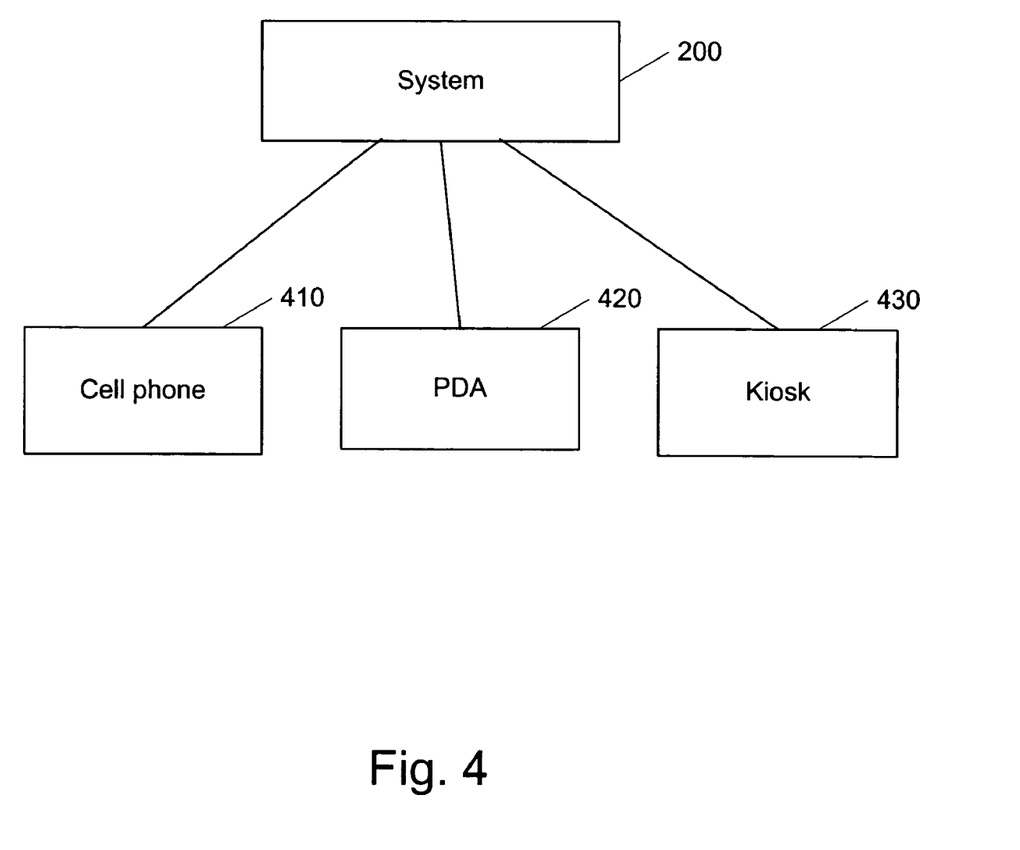
FIG. 4 is a detailed flowchart of the method in accordance with the present invention.

FIG. 4 is an illustration of an alternate embodiment of the present invention. The alternate embodiment includes the system 200 from FIG. 3; however the system 200 is coupled to a plurality of feedback devices 410, 420, 430. These devices could comprise cell-phones, Personal Digital Assistants (PDA's), a kiosk, etc. These devices could be wirelessly coupled to the system 200 (cell phone, PDA) or hard wired into the system 200 (kiosk). One of ordinary skill in the art will readily appreciate that a variety of devices could be utilized while remaining within the spirit and scope of the present invention.

Figure 5:
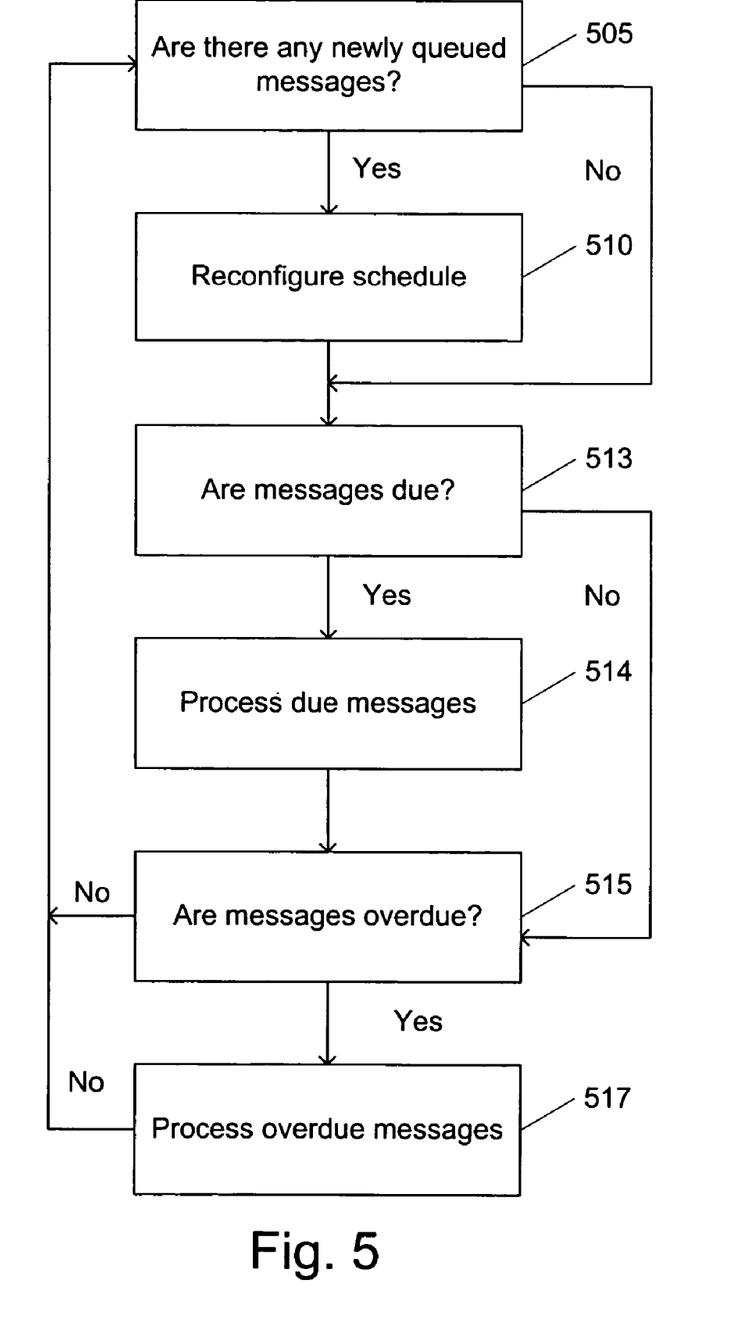
FIG. 5 is a more detailed flowchart of the method in accordance with the present invention.

FIG. 5 is a more detailed flowchart of the method in accordance with the present invention. First, the system checks for newly queued messages, via step 505. If a newly queued message exists, the schedule is reconfigured, via step 510. Either after step 510 or if a newly queued message does not exist, the current schedule is checked for due messages, via step 513. If there are due messages, they are processed via step 514. Either after step 514 or if there are no due messages, the current schedule is checked for overdue messages via step 515. Next, the overdue messages are processed via step 517 and then return to step 505. If there are no overdue messages, return to step 505. Processing of the due and overdue messages is important to provide the feedback required to schedule and transmit the messages at the appropriate time. The following description, along with accompanying figures, will describe processing due and overdue messages in more detail.

Figure 6:
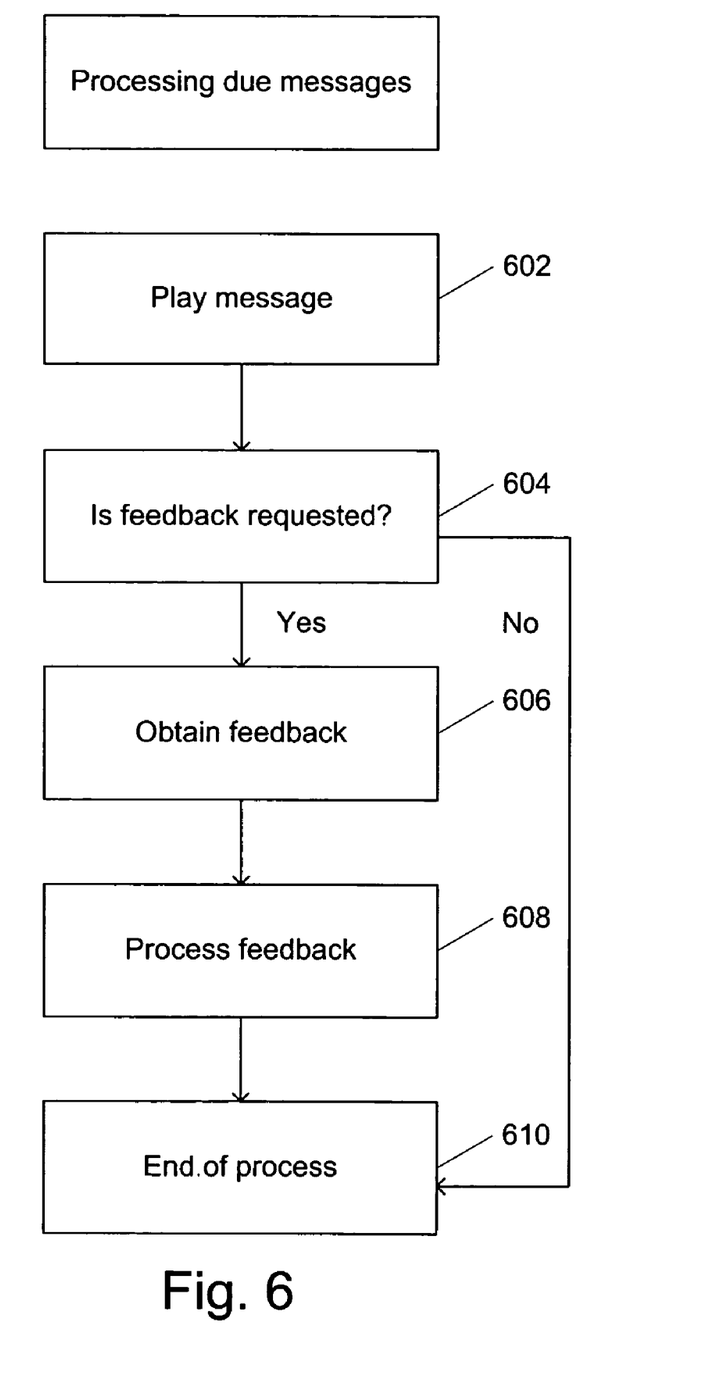
FIG. 6 is a flowchart that illustrates the step of processing due messages.

FIG. 6 is a flowchart that illustrates the step of processing due messages, step 514 of FIG. 5. First the message is played, via step 602. Next, it is determined if feedback is requested, via step 604. If there is no feedback requested, then the process ends, via step 610. If feedback is requested, then it is obtained, via step 606, and processed, via step 608. Thereafter, the process ends.

Figure 7:
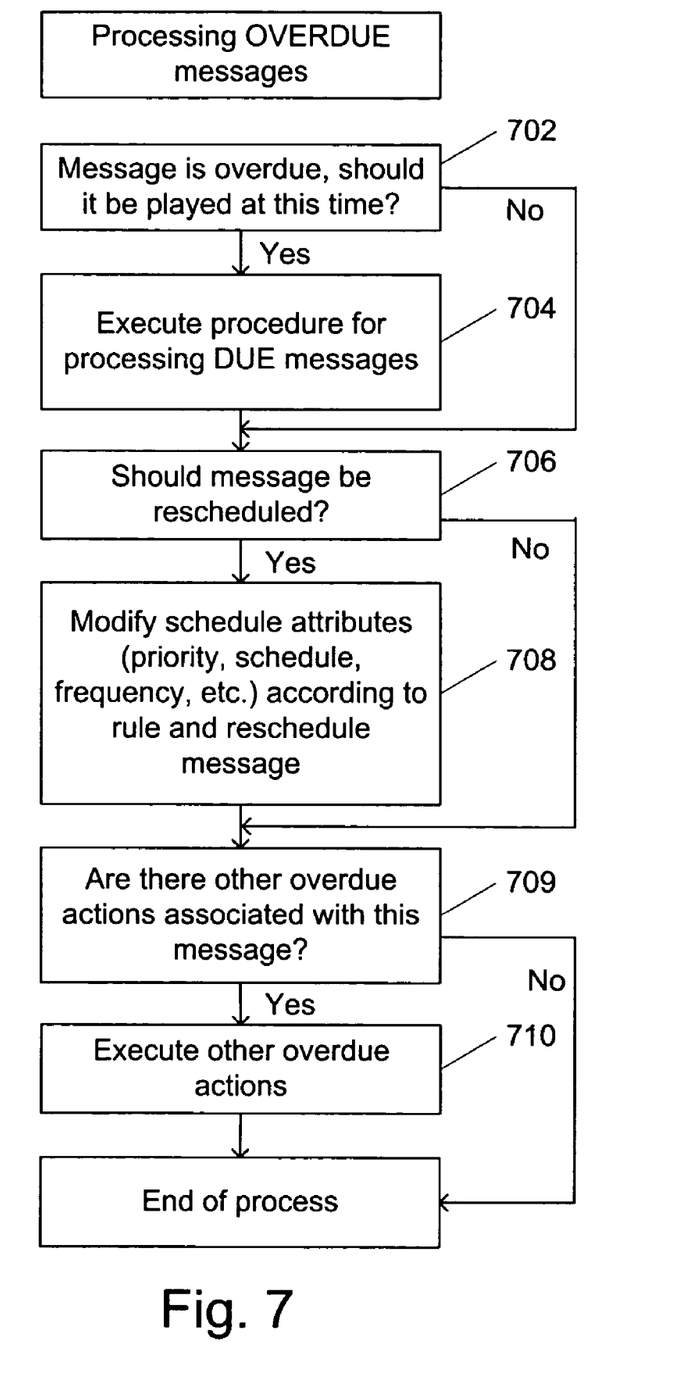
FIG. 7 is a flowchart which illustrates processing overdue messages.

FIG. 7 is a flowchart which illustrates processing overdue messages, STEP 517 of FIG. 5. First, if a message is overdue, it is determined if the overdue message should be played at this time, via step 702. If a message should be played, then the procedure is executed for processing due messages as in FIG.

6, via step 704. If the answer is no, or after step 704, it is then determined whether the overdue message should be rescheduled, via step 706. Immediately playing the overdue message may be desired, for example (step 704). Thereafter, if the message was supposed to be played at a critical time (such as the prime time of activity), the message may be rescheduled to be played during that time (step 706).

If a message should be rescheduled, then the schedule attributes should be modified according to rule and reschedule message, via step 708. The schedule attributes, for example, could be priority, schedule, frequency, etc. of the message. Either after step 708 or if the answer to rescheduling a message is no, then it is determined if there are other overdue actions associated with this message, via step 709. If the answer is no, then that is the end of the process. If the answer is yes, then the other overdue actions should be executed, via step 710. Thereafter, the process ends.

An inherent assumption regarding the ability to receive feedback from a device is the device's ability to receive the command and respond to it. For instance, a customer's cell phone might need to not only join the store's local area network (cell phone's PAN), but may also need to download a module which facilitates this sort of communication with the system 200 (FIG. 1).

Once the feedback is received, the system needs to know what to do with it. The data could be collected and sent as a results set over a socket to another system, collected and stored in a table in the system database for future processing, etc. Once the data is sent to the appropriate receiver, a process may be started either locally or remotely for processing the data.

To illustrate, consider the following examples: A service area might queue an immediate message to the system via a PC which causes a message to be played requesting the manager's presence at in the customer service area. The feedback for this message is a prompt 30 seconds later which asks if the manager has arrived. If the manager has not arrived (clerk responds negatively), or a response to the prompt is not received in a timeout period (perhaps defined as 10 seconds), the message is requeued.

Advertisement is played once an hour in the store for a brand of potato chips. At that time, customers' cell phones & PDA's are prompted and queryed as to whether they would like to receive an automatic discount on the item at checkout, if they respond yes, feedback is queued to a front end system to queue the coupon. Additionally, if the customer has not selected to receive the discount, but enters the zone of the store where the product is located, the system might prompt again asking if they would like to receive a discount on the item.

A customer leaves a perishable item at the front end with a cashier, which they have decided not to purchase. The cashier may queue a message for a person from the department to collect the item and return it to its sales location. The ad hoc message could be queued with the department name as a variable message component, or if there is not staffing in the department, a manager might be paged. After a few minutes the cashier could be prompted by the system in order to ascertain if the item has been collected. If it hasn't, the system would repeat the page.

A method and system for scheduling and transmitting messages is disclosed. Accordingly, the method and system implements a scheme to schedule a queue of messages to be played based on various criteria including, but not limited to the priority of the message, the interruptability of the message, the message length, message repeat parameters, etc. Through the use of the method and system in accordance with the present invention, a scheduled plurality of messages can be transmitted in a clear and professional manner.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for scheduling and transmitting messages comprising:
   a) storing a plurality of audio files in an audio database;
   b) generating a schedule of queued audio messages, each queued audio message including at least one of the plurality of audio files, wherein each queued audio message comprises a plurality of different attributes, the schedule being generated based on the plurality of different attributes, and one of the plurality of different attributes being a priority level of the associated message;
   c) transmitting at least one of the queued audio messages based on the schedule;
   d) reconfiguring the schedule based on a user interaction, including utilizing the plurality of audio files to generate an ad-hoc audio message from the plurality of audio files based on the user interaction, wherein the ad-hoc audio message is a composite audio message including a plurality of component audio files combined to create the ad-hoc audio message, and reconfiguring the schedule to include the ad-hoc audio message based on the priority level of the ad-hoc audio message; and
   e) delivering the queued audio messages and the ad-hoc audio message in accordance with the reconfigured schedule, wherein the queued audio messages and the ad-hoc audio message are played to a store environment for in-store customers, and wherein delivering the queued and ad-hoc audio messages in accordance with the reconfigured schedule includes:
   checking for queued and ad-hoc audio messages that are due and processing the due audio messages if appropriate, including determining if feedback is requested, obtaining the requested feedback from at least one of the in-store customers, and processing the requested feedback, and
   checking for overdue messages and processing the overdue messages if appropriate, including:
      determining if one or more overdue messages should be currently played;
      processing the one or more overdue messages as due audio messages if the one or more overdue messages are to be currently played;
      determining if the one or more overdue messages should be rescheduled;
      modifying the attributes of the overdue messages that are rescheduled;
      determining if there are other overdue actions associated with the overdue messages that are rescheduled; and
      executing the other overdue actions if appropriate.

2. The method of claim 1 wherein the user interaction is initiated via a keypad based device.

3. The method of claim 2 wherein the keypad based device comprises a computer.

4. The method of claim 2 wherein the keypad based device comprises a telephone.

5. The method of claim 1 in which the generating a schedule comprises:
- (b1) building a message structure;
- (b2) building a schedule profile for the plurality of audio files; and
- (b3) associating a message with the schedule profile.

6. The method of claim 1 wherein the ad-hoc audio message has a category, and wherein at least one of the component audio files is a static component that is always used for the category of the ad-hoc audio message, and wherein at least one of the component audio files is a variable component that varies for the category of the ad-hoc audio message, the variable component being selected by the user interaction.

7. The method of claim 1 wherein generating the ad-hoc audio message includes receiving a user selection of a category of message, and receiving user selections of individual variable components of the message which vary for the category of message, the individual variable components combining to form the ad-hoc audio message.

8. The method of claim 1 wherein one of the plurality of attributes is the priority level of the audio message and a different one of the attributes is an interruptability of the audio message.

9. The method of claim 1 wherein the ad-hoc message includes a query played to the in-store customers as to whether the in-store customers would like to receive an automatic discount on an item previously identified in a played one of the queued audio messages, wherein the feedback from the in-store customers indicates an answer to the query, and wherein a coupon is generated in the store environment for customers answering the query appropriately.

10. A method for scheduling and transmitting messages comprising the steps of:
- a) storing a plurality of audio files in an audio database;
- b) generating a schedule of queued audio messages, each queued audio message including at least one of the plurality of audio files, wherein each queued audio message comprises a plurality of different attributes, the schedule being generated based on the plurality of attributes, and one of the plurality of different attributes being a priority level of the associated message, wherein at least one of the queued messages comprises a prompt to obtain feedback, and wherein generating the schedule includes:
  - utilizing the plurality of audio files to generate an ad-hoc audio message from the plurality of audio files based on the user interaction, wherein the ad-hoc audio message is a composite audio message including a plurality of component audio files combined to create the ad-hoc audio message, and
  - reconfiguring the schedule to include the ad-hoc audio message based on a priority level of the ad-hoc audio message;
- c) transmitting the queued audio messages and the ad-hoc audio message based on the schedule, wherein the queued audio messages and the ad-hoc audio message are played to a store environment for in-store customers, and wherein transmitting the queued and ad-hoc audio messages includes checking for queued and ad-hoc audio messages that are due and processing the due audio messages if appropriate;
- d) obtaining the feedback related to the prompt from at least one of the in-store customers and processing the obtained feedback; and
- e) checking for overdue messages and processing the overdue messages if appropriate, including:
  - determining if one or more overdue messages should be currently played;
  - processing the one or more overdue messages as due audio messages if the one or more overdue messages are to be currently played;
  - determining if the one or more overdue messages should be rescheduled;
  - modifying the attributes of the overdue messages that are rescheduled;
  - determining if there are other overdue actions associated with the overdue messages that are rescheduled; and
  - executing the other overdue actions if appropriate.

11. The method of claim 10 in which the generating a schedule comprises:
- (b1) building a message structure;
- (b2) building a schedule profile for the plurality of audio files; and
- (b3) associating a message with the schedule profile.

12. The method of claim 10 wherein the ad-hoc audio message has a category, and wherein at least one of the component audio files is a static component that is always used for the category of the ad-hoc audio message, and wherein at least one of the component audio files is a variable component that varies for the category of the ad-hoc audio message, the variable component being selected by the user interaction.

13. The method of claim 10 wherein generating the ad-hoc audio message includes receiving a user selection of a category of message, and receiving user selections of individual variable components of the message which vary for the category of message, the individual variable components combining to form the ad-hoc audio message.

14. The method of claim 10 wherein one of the plurality of attributes is the priority level of the audio message and a different one of the attributes is an interruptability of the audio message.

15. The method of claim 10 wherein the ad-hoc message includes a query played to the in-store customers as to whether the in-store customers would like to receive an automatic discount on an item previously identified in a played one of the queued audio messages, wherein the feedback from the in-store customers indicates an answer to the query, and wherein a coupon is generated in the store environment for customers answering the query appropriately.

* * * * *